L. H. BIGELOW.
Flower-Vase.
No. 70,316.
Patented Oct. 29, 1867.
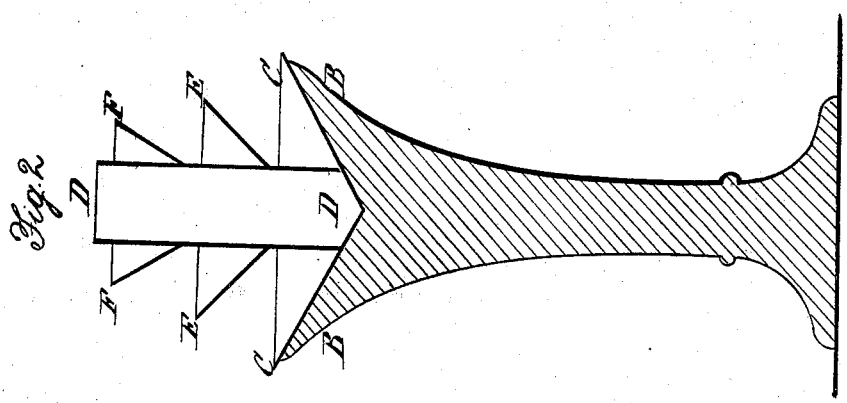
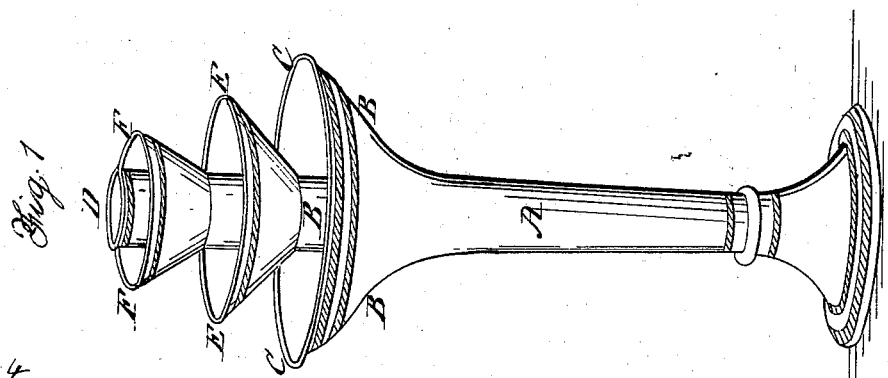
Witnesses:
Thos. H. Dodge
D. L. Miller.
Inventor:
L. H. Bigelow.

United States Patent Office.

L. H. BIGELOW, OF WORCESTER, MASSACHUSETTS.

Letters Patent No. 70,316, dated October 29, 1867.

---

IMPROVED VASE FOR HOLDING FLOWERS.

---

*The Schedule referred to in these Letters Patent and making part of the same.*

---

KNOW ALL MEN BY THESE PRESENTS:

That I, L. H. BIGELOW, of the city and county of Worcester, and Commonwealth of Massachusetts, have invented certain new and useful improvements in Vases for Holding and Preserving Flowers; and I do hereby declare that the following is a full, clear, and exact description of the same, reference being had to the accompanying drawings, forming a part of this specification, in which—

Figure 1 represents a perspective view of my improved pyramidal vase, and

Figure 2 represents a vertical central section.

To enable those skilled in the art to which my invention belongs to make and use the same, I will proceed to describe it more in detail.

In the drawings, the part marked A is the stand or pedestal, upon which rests, in the concave top B, the cup C, to which is attached the stem D, upon which are properly fastened one or more cups E F, the series of cups being made smaller as they ascend, as fully indicated in the drawings. The series of cups might be made separately, and set one within the other, but having such depth as to rise one above the other, to give the proper shape to the flowers when arranged therein. The series of cups may be made separately from the pedestal, or the cups and pedestal may be made all together, as may be preferred.

When applied to use, the cups are partially filled with water, and the stems of the flowers are inserted in the cups, and when the series of cups are all filled the flowers present a beautiful form of conical shape, although the stems of the flowers are all of the same length; again, by my arrangement, the water is brought into immediate contact with the stems of the upper flowers, although the stems may be cut very short.

The stem D gives proper strength to the bouquet of flowers, while at the same time the labor of forming and arranging the flowers in the desired shape is much less than by the old modes heretofore in use. Again, the flowers retain a uniform freshness, which is not the case when they are arranged in the ordinary manner. The parts of the vase may be made of any desired material.

Having described my improved vase, what I claim therein as new, and of my invention, and desire to secure by Letters Patent, is—

1. A vase, provided with a series of cups or vessels, arranged one above the other, substantially in the manner and for the purposes herein described.

2. The combination, with the pedestal of the vase, of the detachable cups or vessels under the arrangement herein shown and set forth.

L. H. BIGELOW.

Witnesses:
   THOS. H. DODGE,
   D. L. MILLER.